US012728724B2

(12) United States Patent
Ohsugi

(10) Patent No.: US 12,728,724 B2
(45) Date of Patent: Sep. 8, 2026

(54) MARKING LINE DETECTION DEVICE

(71) Applicant: TOYOTA JIDOSHA KABUSHIKI KAISHA, Toyota (JP)

(72) Inventor: Masamichi Ohsugi, Sunto-gun Shizuoka (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 24 days.

(21) Appl. No.: 18/794,391

(22) Filed: Aug. 5, 2024

(65) Prior Publication Data

US 2025/0050735 A1 Feb. 13, 2025

(30) Foreign Application Priority Data

Aug. 9, 2023 (JP) ................................ 2023-129980

(51) Int. Cl.

| | |
|---|---|
| ***B60K 35/28*** | (2024.01) |
| ***B60K 35/22*** | (2024.01) |
| ***G06V 10/77*** | (2022.01) |
| ***G06V 10/776*** | (2022.01) |
| ***G06V 20/56*** | (2022.01) |
| ***G06V 20/58*** | (2022.01) |
| ***G07C 5/08*** | (2006.01) |

(52) U.S. Cl.

CPC .............. *B60K 35/28* (2024.01); *B60K 35/22* (2024.01); *G06V 10/776* (2022.01); *G06V 20/588* (2022.01); *G07C 5/0808* (2013.01); *B60K 2360/166* (2024.01)

(58) Field of Classification Search

CPC .. B60K 35/28; B60K 35/22; B60K 2360/166; G06V 10/776; G06V 20/588; G06V 10/44; G06V 10/82; G06V 10/98; G07C 5/0808; G01C 21/3602

See application file for complete search history.

(56) References Cited

U.S. PATENT DOCUMENTS

2005/0196019 A1* 9/2005 Taniguchi ............ G06V 20/588 382/104
2019/0340849 A1* 11/2019 Uchida .............. G05B 23/0221
2021/0237641 A1* 8/2021 Im ............................ B60Q 1/20

(Continued)

FOREIGN PATENT DOCUMENTS

JP 2006-311299 A 11/2006
JP 2016-126605 A 7/2016

(Continued)

*Primary Examiner* — Rodney A Butler
(74) *Attorney, Agent, or Firm* — Dinsmore & Shohl LLP

(57) ABSTRACT

There is provided a marking line detection device for detecting a marking line in front of a vehicle. The marking line detection device includes: a known marking line recognition unit configured to recognize a known marking line in front of the vehicle based on past marking line detection information or map information including marking line information and location information of the vehicle; a marking line detection unit configured to detect a marking line in front of the vehicle with the marking line detection model; and an information providing unit configured to perform image display of the known marking line and the marking line for a user of the vehicle when the amount of deviation in a width direction between the known marking line and the marking line is equal to or greater than an image display threshold value.

8 Claims, 6 Drawing Sheets

(56) References Cited

U.S. PATENT DOCUMENTS

| | | | |
|---|---|---|---|
| 2022/0032955 A1 | 2/2022 | Xiang et al. | |
| 2022/0309804 A1 | 9/2022 | Inoue et al. | |
| 2022/0383646 A1 | 12/2022 | Hosoya et al. | |
| 2024/0028972 A1* | 1/2024 | Tensmeyer | G06F 18/214 |

FOREIGN PATENT DOCUMENTS

| | | |
|---|---|---|
| JP | 2020-153908 A | 9/2020 |
| JP | 2022-024741 A | 2/2022 |
| JP | 2022-124232 A | 8/2022 |

* cited by examiner

MARKING LINE DETECTION DEVICE

CROSS-REFERENCE TO RELATED APPLICATIONS

This application is based upon and claims the benefit of priority from Japanese Patent Application No. 2023-129980, filed on Aug. 9, 2023, the entire contents of which are incorporated herein by reference.

TECHNICAL FIELD

The present disclosure relates to a marking line detection device.

BACKGROUND

Conventionally, Japanese Unexamined Patent Publication No. 2006-311299 is known as a technical document regarding a marking line detection device. Japanese Unexamined Patent Publication No. 2006-311299 describes that, in a device for detecting the parking lot line of a parking lot where a vehicle is parked based on an image captured by an imaging device, a past image stored in a past image storage device is displayed so as to overlap a current image when the parking lot line detected by a parking lot line detection device is incomplete.

SUMMARY

Incidentally, the use of machine learning models in marking line detection is being considered. However, if the training of the machine learning model is not sufficient, a deviation may occur in the marking line detection result. For this reason, when detecting marking lines using a machine learning model, it is necessary to appropriately inform the user that a deviation has occurred in the marking line detection result.

One aspect of the present disclosure is a marking line detection device for detecting a marking line in front of a vehicle using a marking line detection model that is a machine learning model used for marking line detection. The marking line detection device includes: a known marking line recognition unit configured to recognize a known marking line in front of the vehicle based on past marking line detection information or map information including marking line information and location information of the vehicle; a marking line detection unit configured to detect a marking line in front of the vehicle with the marking line detection model based on a detection result of an external sensor of the vehicle; and an information providing unit configured to perform image display of the known marking line and the marking line for a user of the vehicle when an amount of deviation in a width direction between the known marking line and the marking line is equal to or greater than an image display threshold value.

According to the marking line detection device according to one aspect of the present disclosure, when there is a difference between the known marking line, which is a marking line detected in the past or a marking line on the map, and the currently detected marking line, image display of the known marking line and the marking line is performed for the user. Therefore, it is possible to appropriately inform the user that a deviation has occurred in the marking line detection result.

The marking line detection device according to one aspect of the present disclosure may further include: a sensor abnormality determination unit configured to determine that there is an abnormality in the external sensor when an abnormal region is continuously detected in at least a part of a detection range of the external sensor for a predetermined traveling time; and a model abnormality determination unit configured to determine that there is an abnormality in the marking line detection model when the sensor abnormality determination unit does not determine that there is an abnormality in the external sensor when the amount of deviation between the known marking line and the marking line is equal to or greater than the image display threshold value. The abnormal region may be a region where the amount of deviation in the width direction between the known marking line and the marking line is equal to or greater than a sensor abnormality threshold value or a region where the marking line is not detected even though the known marking line is present.

According to one aspect of the present disclosure, it is possible to appropriately inform the user that a deviation has occurred in the marking line detection result.

DETAILED DESCRIPTION

Hereinafter, embodiments of the present disclosure will be described with reference to the diagrams.

[Configuration of Marking Line Detection Device]

Figure 1:
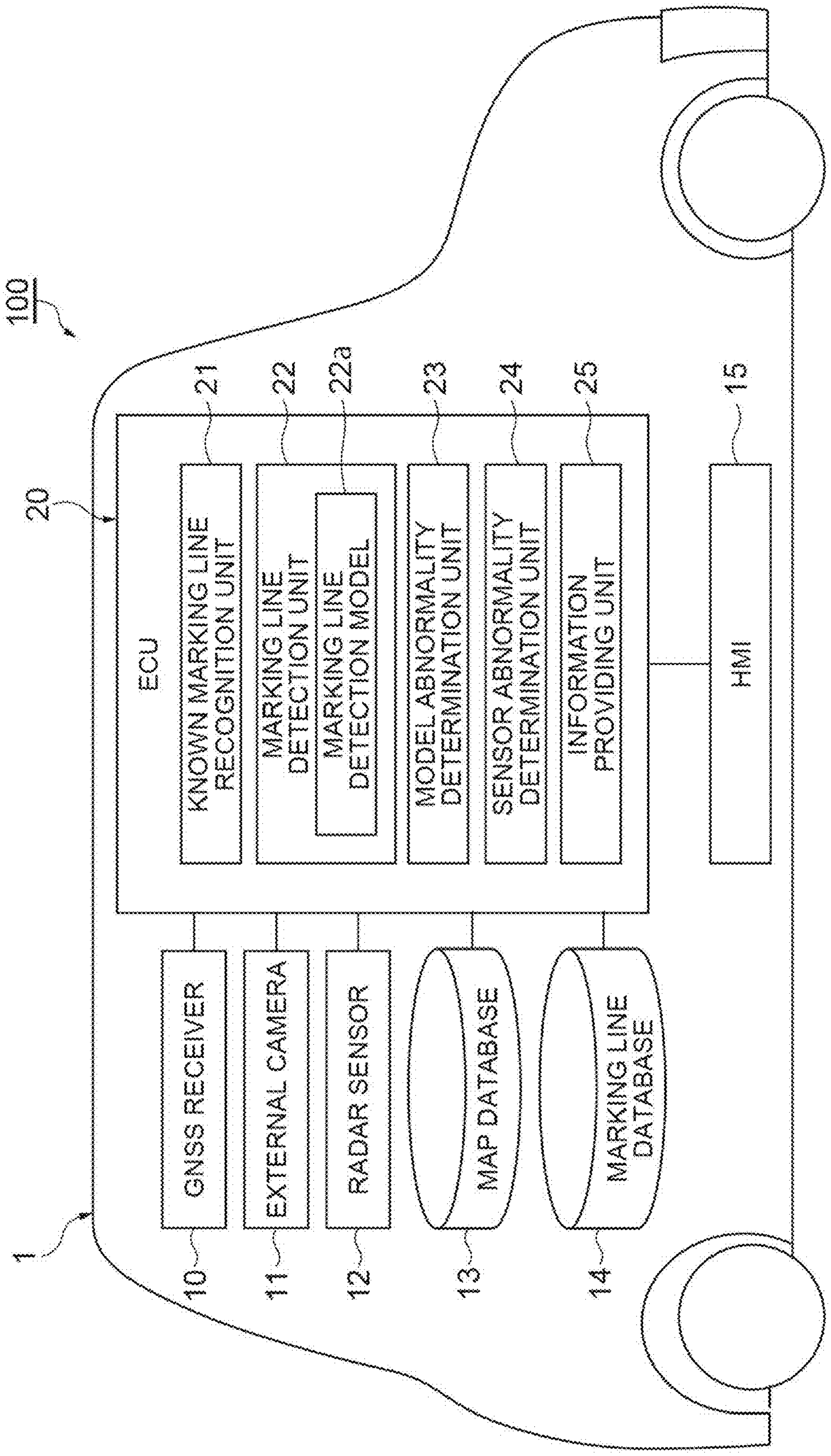
FIG. 1 is a block diagram showing a marking line detection device according to an embodiment.

FIG. 1 is a block diagram showing a marking line detection device 100 according to an embodiment. As shown in FIG. 1, the marking line detection device 100 is a device that is mounted in a vehicle 1 to detect marking lines in front of the vehicle 1 traveling on the road. The marking line detection device 100 transmits the marking line detection result to an automatic driving system or a driving support system of the vehicle 1, for example. Marking lines are white lines (including solid lines and broken lines) that form a lane on the road. The marking line detection device 100 may be configured as a part of an automatic driving system or a driving support system.

The marking line detection device 100 includes an electronic control unit (ECU) 20. The ECU 20 is an electronic control unit having a central processing unit (CPU) and a storage unit. The storage unit includes, for example, a read only memory (ROM), a random access memory (RAM), and an electrically erasable programmable read-only memory (EEPROM). The ECU 20 implements various functions by executing programs stored in the storage unit using the CPU. The ECU 20 may include a plurality of electronic units.

As shown in FIG. 1, the ECU 20 is connected to a GNSS receiver 10, an external camera 11, a radar sensor 12, a map database 13, a marking line database 14, and a human machine interface (HMI) 15.

The GNSS receiver 10 measures the location of the vehicle 1 (for example, the latitude and longitude of the vehicle 1) by receiving signals from positioning satellites. The GNSS receiver 10 transmits the measured location information of the vehicle 1 to the ECU 20.

The external camera 11 is an imaging device (external sensor) for imaging the external situation of the vehicle 1. The external camera 11 is provided, for example, on the back side of the windshield of the vehicle 1 to image the front of the vehicle 1. The external camera 11 may be provided on the side or rear of the vehicle 1 so that the surroundings of the vehicle 1 can be imaged. The external camera 11 transmits a captured image of the outside of the vehicle 1 to the ECU 20.

The radar sensor 12 is a detection device (external sensor) that detects an object around the vehicle 1 using radio waves (for example, millimeter waves) or light. The radar sensor 12 includes, for example, a millimeter wave radar or a light detection and ranging (LiDAR) provided in a plurality of directions of the vehicle 1. The radar sensor 12 detects an object by transmitting radio waves or light around the vehicle and receiving radio waves or light reflected by the object. The radar sensor 12 transmits information regarding the detected object to the ECU 20. Examples of the object include a marking line.

The map database 13 is a database that stores map information. The map database 13 is formed in a storage device such as a hard disk drive (HDD) mounted in the vehicle 1, for example. The map information includes road location information, road shape information (for example, curves, types of straight sections, and curvatures of curves), location information of intersections and branch points, and the like.

In addition, the map information includes location information of marking lines as information regarding marking lines on the road. The information regarding marking lines may include information regarding the types of marking lines (solid lines, broken lines, double solid lines, roadway center lines, lane boundary lines, and the like). In addition, the map database 13 is not limited to being installed in the vehicle 1, and may be formed in a server that can communicate with the vehicle 1.

The marking line database 14 is a database that stores past marking line detection information. The marking line database 14 is also formed, for example, in the storage device of the vehicle 1. The past marking line detection information is the location information of marking lines detected by the marking line detection device 100 in the past. The past marking line detection information is stored in association with the location of the vehicle 1 on the map. In addition, the marking line database 14 may be configured to be able to share past marking line detection information acquired by other vehicles through a server. The marking line database 14 is not limited to being installed in the vehicle 1, and may be formed in a server that can communicate with the vehicle 1.

In addition, the ECU 20 of the marking line detection device 100 does not necessarily need to be connected to the marking line database 14 when the map information includes marking line information. Conversely, if the marking line detection device 100 can acquire past marking line detection information, the map information does not need to include the marking line information.

The HMI 15 is an interface for inputting and outputting information between the ECU 20 and the driver. The HMI 15 includes, for example, a display and a speaker provided inside the vehicle. The HMI 15 outputs an image from the display and a sound from the speaker in response to control signals from the ECU 20. The display may be a multi information display (MID) or a head up display (HUD). The HMI 15 may include various indicators.

Next, the functional configuration of the ECU 20 will be described. As shown in FIG. 1, the ECU 20 includes a known marking line recognition unit 21, a marking line detection unit 22, a model abnormality determination unit 23, a sensor abnormality determination unit 24, and an information providing unit 25.

The known marking line recognition unit 21 recognizes known marking lines in front of the vehicle 1 based on map information including marking line information or past marking line detection information stored in the marking line database 14 and the location information of the vehicle 1 measured by the GNSS receiver 10. The known marking line is a marking line that is known from the past marking line detection information or the map information. In addition, the location information of the vehicle 1 may be acquired by simultaneous localization and mapping (SLAM) or the like.

The known marking line recognition unit 21 recognizes known marking lines in front of the vehicle 1 based on the past marking line detection information and the location information of the vehicle 1, for example. The known marking line recognition unit 21 acquires the past marking line detection information corresponding to a region within a predetermined distance in front of the vehicle 1 from the marking line database 14 by using the location information of the vehicle 1. For example, the known marking line recognition unit 21 recognizes the known marking lines in front of the vehicle 1 by projecting the locations of the marking lines in the past marking line detection information onto a map coordinate system with the location of the vehicle 1 as a reference.

The known marking line recognition unit 21 may recognize the known marking lines in front of the vehicle 1 based on the map information including the marking line information and the location information of the vehicle 1. The known marking line recognition unit 21 acquires marking line information corresponding to a region within a predetermined distance in front of the vehicle 1 from the map information. For example, the known marking line recognition unit 21 recognizes the known marking lines in front of the vehicle 1 by projecting the marking lines included in the marking line information onto a map coordinate system with the location of the vehicle 1 as a reference. In addition, the method for recognizing known marking lines is not limited to the above-described method.

The known marking line recognition unit 21 may determine whether or not marking line information corresponding to the current location of the vehicle 1 is included in the map information, based on the location information of the vehicle 1 and the map information. When the marking line information corresponding to the current location of the vehicle 1 is included in the map information, the known marking line recognition unit 21 may give priority to the marking line information in the map information rather than the past marking line detection information in the marking line database 14. In this case, the known marking line recognition unit 21 recognizes the known marking lines based on the map information.

Alternatively, the known marking line recognition unit 21 may give priority to the new one by comparing the update date and time of the map information corresponding to the current location of the vehicle 1 with the acquisition date and time of the past marking line detection information in the marking line database 14 corresponding to the current location of the vehicle 1. When the acquisition date and time of the past marking line detection information is newer than the update date and time of the map information, the known marking line recognition unit 21 recognizes the known marking lines based on the past marking line detection information in the marking line database 14.

The marking line detection unit 22 detects the marking lines in front of the vehicle 1 from a marking line detection model 22*a* based on at least one of the captured image of the external camera 11 and the detection result of the radar sensor 12.

The marking line detection model 22*a* is a machine learning model that is trained by deep learning to output a marking line detection result from at least one of the captured image of the external camera 11 and the detection result of the radar sensor 12. The marking line detection model 22*a* is a neural network such as a convolutional neural network (CNN). A neural network can include a plurality of layers, including a plurality of convolutional layers and pooling layers. The marking line detection model 22*a* may be a recurrent neural network (RNN) that also uses past detection results, including a previous marking line detection result, as its input.

The marking line detection unit 22 acquires the detection result of the marking lines in front of the vehicle 1 as an output from the marking line detection model 22*a* by inputting at least one of the captured image of the external camera 11 or the detection result of the radar sensor 12 to the marking line detection model 22*a*.

The model abnormality determination unit 23 determines whether or not there is an abnormality in the marking line detection model 22*a* when the amount of deviation in the width direction between the known marking line recognized by the known marking line recognition unit 21 and the marking line detected by the marking line detection unit 22 is equal to or greater than the abnormality determination threshold value. The abnormality determination threshold value is a threshold value set in advance to determine an abnormality in marking line detection. The amount of deviation can be calculated as the average value, median value, or maximum value of the distance in the width direction between the nearest known marking line and the marking line. The amount of deviation is measured, for example, in a plane coordinate system or a map coordinate system (geographical coordinate system) with the location of the vehicle 1 as a reference. When the known marking line and the marking line are detected on each of the left and right sides of the vehicle 1, the larger one of the amount of deviation between the known marking line and the marking line on the right side and the amount of deviation between the known marking line and the marking line on the left side is used for determination.

The model abnormality determination unit 23 determines whether or not there is an abnormality in the marking line detection model 22*a* based on the known marking line recognized by the known marking line recognition unit 21 and the marking line detected by the marking line detection unit 22. Specifically, the model abnormality determination unit 23 determines that there is an abnormality in the marking line detection model 22*a*, for example, when the comparison result between the known marking line and the marking line is similar to a model abnormality determination pattern stored in advance. The model abnormality determination pattern is a record of a specific pattern that is observed when the marking line detection model 22*a* shows an abnormality. When the marking line detection model 22*a* functions normally, the known marking line and the marking line detected by the marking line detection model 22*a* match or are similar. On the other hand, when the marking line detection model 22*a* becomes abnormal, the amount of deviation (gap) between the known marking line and the marking line detected by the marking line detection model 22*a* increases.

In this case, the comparison result between the known marking line and the marking line tends to be different from the erroneous detection of the marking line when the external sensor is abnormal. Therefore, by focusing on the comparison result between the known marking line and the marking line, when the amount of deviation between the known marking line and the marking line is large, it is possible to determine whether this is due to an abnormality in the external sensor or an abnormality in the marking line detection model 22*a*.

Figure 2:
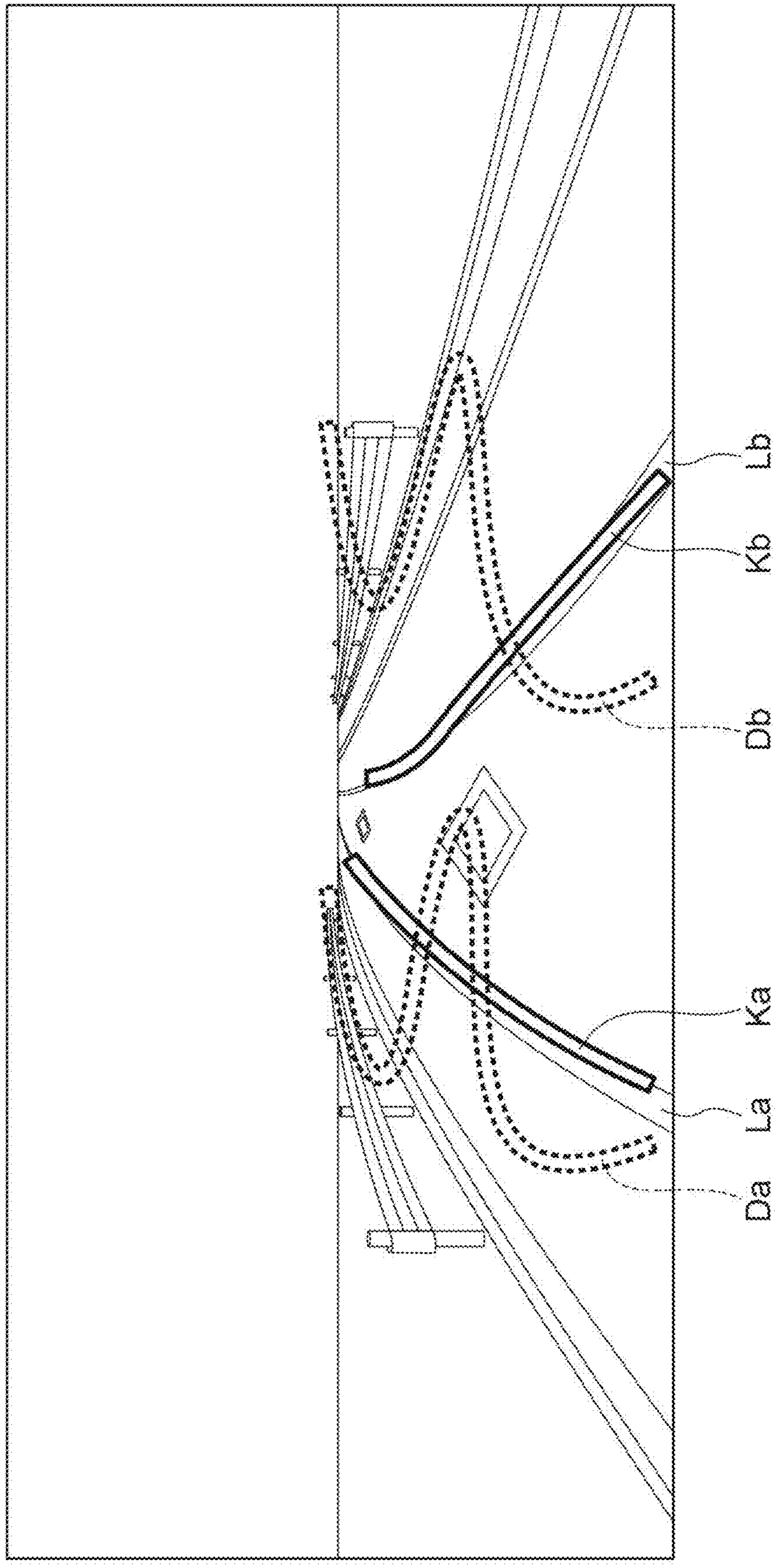
FIG. 2 is a drawing showing an example of a model abnormality determination pattern.

FIG. 2 is a drawing showing an example of the model abnormality determination pattern. FIG. 2 shows a real marking line La on the left side and a real marking line Lb on the right side that are actual left and right marking lines in front of the vehicle 1, a known marking line Ka on the left side and a known marking line Kb on the right side, and a left marking line Da and a right marking line Db detected by the marking line detection unit 22. The known marking line Ka on the left side and the known marking line Kb on the right side almost match the real marking line La on the left side and the real marking line Lb on the right side, respectively.

In the situation shown in FIG. 2, the left marking line Da and the right marking line Db are detected as meandering curves. If such meandering marking lines are detected, there is a high possibility that the marking line detection model 22*a* is abnormal, not the external sensor. When the left marking line Da and the right marking line Db are detected to be meandering compared to the known marking line Ka on the left side and the known marking line Kb on the right side that are approximately straight lines, the model abnormality determination unit 23 determines that there is an abnormality in the marking line detection model 22*a* because the left marking line Da and the right marking line Db are similar to the model abnormality determination pattern shown in FIG. 2.

Figure 3:
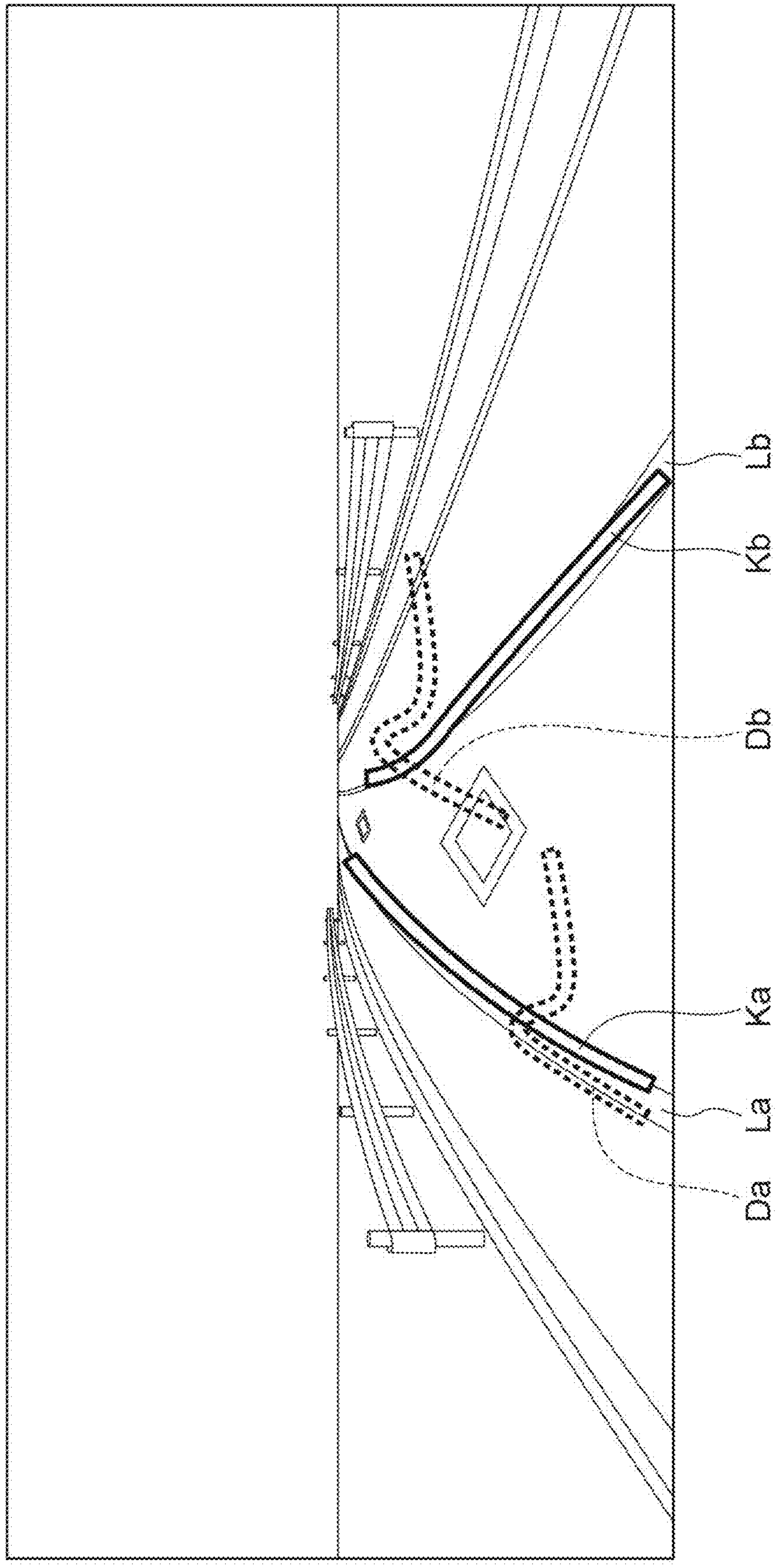
FIG. 3 is a drawing showing another example of the model abnormality determination pattern.

FIG. 3 is a drawing showing another example of the model abnormality determination pattern. FIG. 3, the left marking line Da and the right marking line Db are detected as being folded back into a mountain in the back-and-forth direction of the vehicle 1. If such folded marking lines are detected, there is a high possibility that the marking line detection model 22*a* is abnormal. When the left marking line Da and the right marking line Db are detected to be folded in the back-and-forth direction compared to the known marking line Ka on the left side and the known marking line Kb on the right side that are approximately straight lines, the model abnormality determination unit 23 determines that there is an abnormality in the marking line detection model 22*a* because the left marking line Da and the right marking line Db are similar to the model abnormality determination pattern shown in FIG. 3.

The model abnormality determination pattern is not limited to the patterns shown in FIGS. 2 and 3, and various patterns are included. The model abnormality determination pattern may be set based on simulation results of the marking line detection model 22*a* or detection results in actual test driving.

In addition, examples of the model abnormality determination pattern may include a pattern in which the left marking line Da and/or the right marking line Db detected by the marking line detection unit 22 are located outside the detection range of the external sensor (for example, outside the imaging range of the external camera 11) even though the known marking lines are located within the detection range of the external sensor. When the left marking line Da and/or the right marking line Db are located outside the detection range of the external sensor, there is a high possibility that the marking line detection model 22*a* is abnormal.

In addition, the model abnormality determination unit 23 may determine whether or not there is an abnormality in the marking line detection model 22*a* based on the comparison result between the known marking line and the marking line, regardless of the model abnormality determination pattern. Assuming that the known marking line is an approximately straight line or curve that does not meander, the model abnormality determination unit 23 may determine that there is an abnormality in the marking line detection model 22*a* when the maximum value of the width between the right end and the left end of the meandering marking line detected by the marking line detection unit 22 is equal to or greater than a predetermined value and the number of meandering times (corresponding to the shape degree of the marking line) is equal to or greater than a predetermined number of times.

Similarly, assuming that the known marking line is an approximately straight line or curve (curve that has a curvature less than a predetermined curvature and does not include a sharp curve), the model abnormality determination unit 23 may determine that there is an abnormality in the marking line detection model 22*a* when the marking line includes a plurality of coordinate points spaced apart from each other in the horizontal direction by folding back as shown in FIG. 3. The model abnormality determination unit 23 may determine that there is an abnormality in the marking line detection model 22*a* when the number of coordinate points spaced apart from each other in the horizontal direction is equal to or greater than the threshold value. The coordinate points may be counted in a plane coordinate system or a map coordinate system, or may be counted on a captured image. The model abnormality determination unit 23 may determine that there is an abnormality in the marking line detection model 22*a* when the marking line detected by the marking line detection unit 22 is located outside the detection range of the external sensor even though the known marking line is located within the detection range of the external sensor.

In addition, assuming that the amount of deviation in the width direction between the known marking line recognized by the known marking line recognition unit 21 and the marking line detected by the marking line detection unit 22 is equal to or greater than the abnormality determination threshold value (image display threshold value), the model abnormality determination unit 23 may determine that there is an abnormality in the marking line detection model 22*a* when the sensor abnormality determination unit 24, which will be described later, determines that there is no abnormality in the external sensor.

The sensor abnormality determination unit 24 determines whether or not there is an abnormality in an external sensor, such as the external camera 11 or the radar sensor 12, when the amount of deviation in the width direction between the known marking line recognized by the known marking line recognition unit 21 and the marking line detected by the marking line detection unit 22 is equal to or greater than the abnormality determination threshold value. The abnormality determination threshold value may be the same value as the abnormality determination threshold value of the model abnormality determination unit 23, or may be a different value.

The sensor abnormality determination unit 24 determines that there is an abnormality in the external sensor when an abnormal signal is transmitted from the external camera 11 or the radar sensor 12, for example. The sensor abnormality determination unit 24 may determine that there is an abnormality in the external camera 11 when frequent noise, brightness abnormality, chromaticity abnormality, and the like occur in the captured image of the external camera 11. Based on the detection result of the radar sensor 12, the sensor abnormality determination unit 24 may determine that there is an abnormality in the radar sensor 12 when frequent noise, clutter fixation, and the like occur.

The sensor abnormality determination unit 24 may determine whether or not the sensor abnormality determination conditions set in advance are satisfied based on the captured image of the external camera 11 or the detection result of the radar sensor 12. The sensor abnormality determination conditions are conditions used to determine whether or not the external sensor of the vehicle 1 is abnormal. For example, the sensor abnormality determination unit 24 determines that the sensor abnormality determination conditions are satisfied when frequent noise, brightness abnormality, or chromaticity abnormality occurs in the captured image of the external camera 11 or when there are frequent noise, clutter fixation, and the like in the detection result of the radar sensor 12.

In addition, the sensor abnormality determination unit 24 determines that the sensor abnormality determination conditions are satisfied when an abnormal region is continuously detected in a part of the imaging range of the external camera 11 for a predetermined traveling time. Instead of the imaging range of the external camera 11, the detection range of the radar sensor 12 may be used. The abnormal region is a region where a detection abnormality occurs on the captured image of the external camera 11 due to dirt or water droplets adhering to the lens of the external camera 11, for example. The abnormal region may be a region where a detection abnormality occurs within the detection range of the radar sensor 12 due to dirt or water droplets adhering to the detection part of the radar sensor 12. The traveling time is the time counted while the vehicle 1 is traveling. The traveling time is not counted when the vehicle 1 is stopped.

Figure 4:
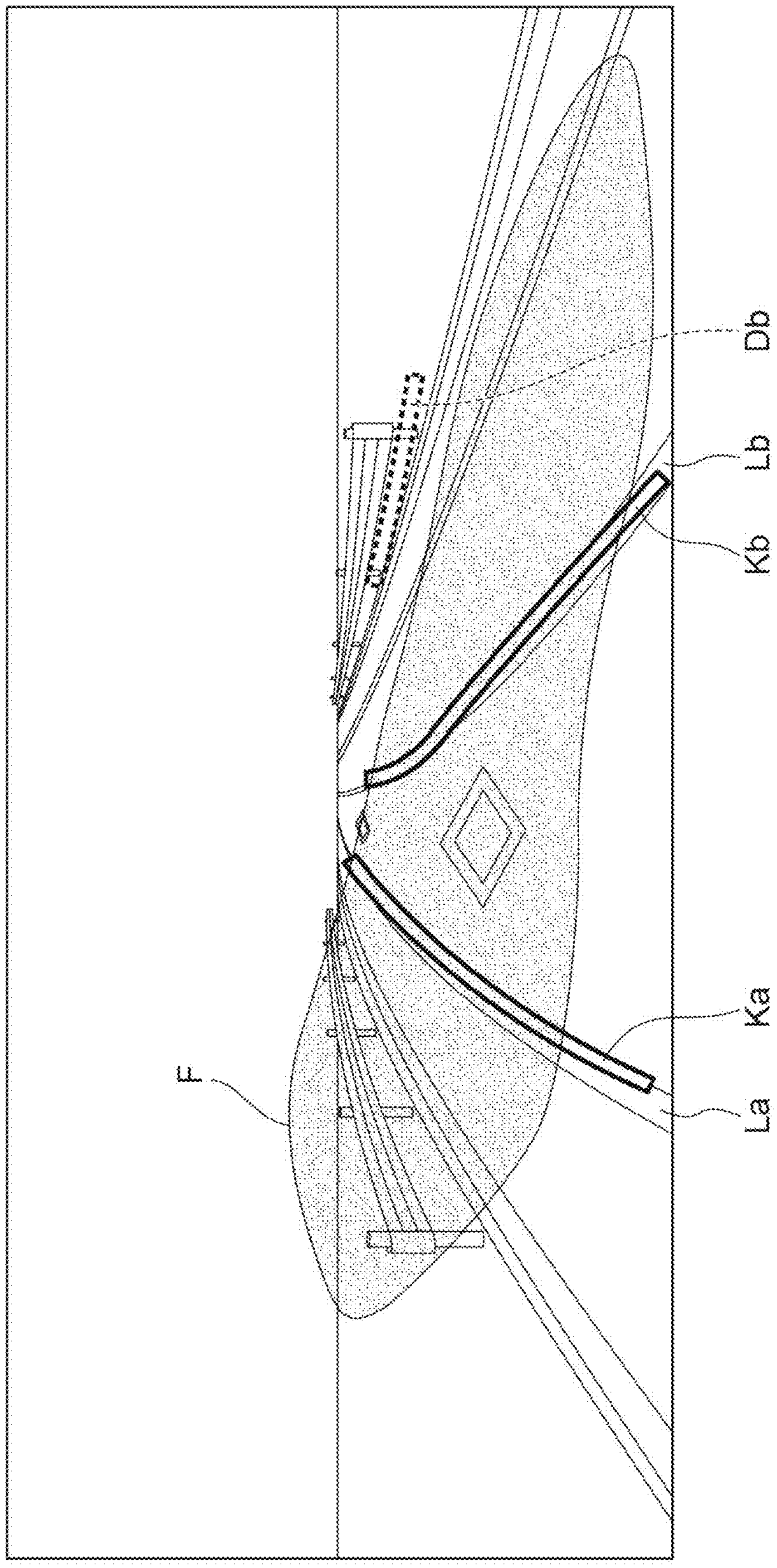
FIG. 4 is a drawing showing an example of a case where incorrect detection of a marking line occurs due to adhesion of dirt.

FIG. 4 is a drawing showing an example of a case where erroneous detection of a marking line occurs due to adhesion of dirt. FIG. 4 shows an abnormal region F caused by the contamination of the lens. In the situation shown in FIG. 4, the marking line cannot be detected due to the influence of the abnormal region F (dirt), and the curb is erroneously detected as the marking line Db.

The sensor abnormality determination unit 24 recognizes, as an abnormal region, a region where the amount of deviation in the width direction between the known marking line and the marking line is equal to or greater than the sensor abnormality threshold value or a region where no marking line is detected even though the known marking line exists (a region on the imaging range). The sensor abnormality threshold value is a threshold value smaller than the abnormality determination threshold value. The sensor abnormality determination unit 24 determines that the sensor abnormality determination conditions are satisfied when the abnormal region F is continuously detected at a predetermined position within the imaging range for a predetermined traveling time even though the vehicle 1 is traveling.

The abnormal region may also be caused by adhesion of water droplets. In the case of water droplets, there are cases where the marking line can be detected without being directly blocked from being detected. However, due to the refraction of light, the position of the marking line may be distorted, and thus detected at an incorrect position.

The information providing unit 25 performs image display of the known marking line and the marking line for the user of the vehicle 1 when the amount of deviation in the width direction between the known marking line recognized by the known marking line recognition unit 21 and the marking line detected by the marking line detection unit 22 is equal to or greater than the image display threshold value. The image display threshold value is a threshold set for determining the image display of the known marking line and the marking line. The image display threshold value may be the same value as the abnormality determination threshold value, or may be a smaller value than the abnormality determination threshold value.

The information providing unit 25 performs image display of the known marking line and the marking line on the display of the HMI 15. For example, the information providing unit 25 performs image display as shown in FIGS. 2 to 4. The information providing unit 25 may display the abnormal region F when the abnormal region F is detected by the sensor abnormality determination unit 24 as shown in FIG. 4. Since both the known marking line (past marking line for reference) and the marking line (marking line currently detected by the vehicle 1 and used for automatic driving or driving support) are displayed in the image, the user can understand the marking line detection situation by comparison with the known marking line.

In addition, the information providing unit 25 does not necessarily need to display an image so as to overlap the scenery in front of the vehicle 1 as shown in FIGS. 2 to 4. The information providing unit 25 may display the known marking line and the marking line as images in a bird's view or in plan view. The information providing unit 25 may virtually display the display corresponding to the vehicle 1, the known marking line, and the marking line in a bird's-eye view or in plan view.

When the known marking line in front of the vehicle 1 is recognized by the known marking line recognition unit 21 but the marking line in front of the vehicle 1 cannot be detected by the marking line detection unit 22, the information providing unit 25 may notify the user of the marking line detection error. The notification of the marking line detection error is a notification to inform the user that the marking line cannot be detected even though the known marking line is present. When the marking line cannot be detected at a location where the known marking line has been recognized, there is a high possibility that there is an error in the marking line detection device 100, with exceptions such as road construction zones. Therefore, the information providing unit 25 notifies the user of the marking line detection error by controlling the HMI 15 to display an image on the display and/or output a sound from the speaker.

The information providing unit 25 may notify the user of a model abnormality when the model abnormality determination unit 23 determines that there is an abnormality in the marking line detection model 22*a*. The model abnormality notification is a notification to inform the user that there is an abnormality in the marking line detection model 22*a*. The information providing unit 25 notifies the user of the model abnormality by controlling the HMI 15 to display an image on the display and/or output a sound from the speaker.

The information providing unit 25 may notify the user of a sensor abnormality when the sensor abnormality determination unit 24 determines that there is an abnormality in the external sensor. The sensor abnormality notification is a notification to inform the user that there is an abnormality in the external sensor. The information providing unit 25 notifies the user of the sensor abnormality by controlling the HMI 15 to display an image on the display and/or output a sound from the speaker.

When the sensor abnormality determination unit 24 detects the abnormal region F, the information providing unit 25 may perform complementation processing (rewriting processing) for the abnormal region F when performing image display for the user. The complementation processing is the processing for replacing the marking line (marking line currently detected by the vehicle 1 and used for automatic driving or driving support) within the abnormal region F in the imaging range with a known marking line.

For example, when the sensor abnormality determination unit 24 detects the abnormal region F, the information providing unit 25 may read parts corresponding to the abnormal region F from among past known marking lines corresponding to the current location of the vehicle and may detect these parts as marking lines. In addition, the information providing unit 25 may set a rectangular region including the abnormal region F as a complementation target, may set the lower half of the imaging range including the abnormal region F as a complementation target, or may set the entire imaging range as a complementation target. The information providing unit 25 displays, for the user, an image including the known marking line and the marking line that have been subjected to the complementation processing.

[Processing Method of Marking Line Detection Device]

Figure 5:
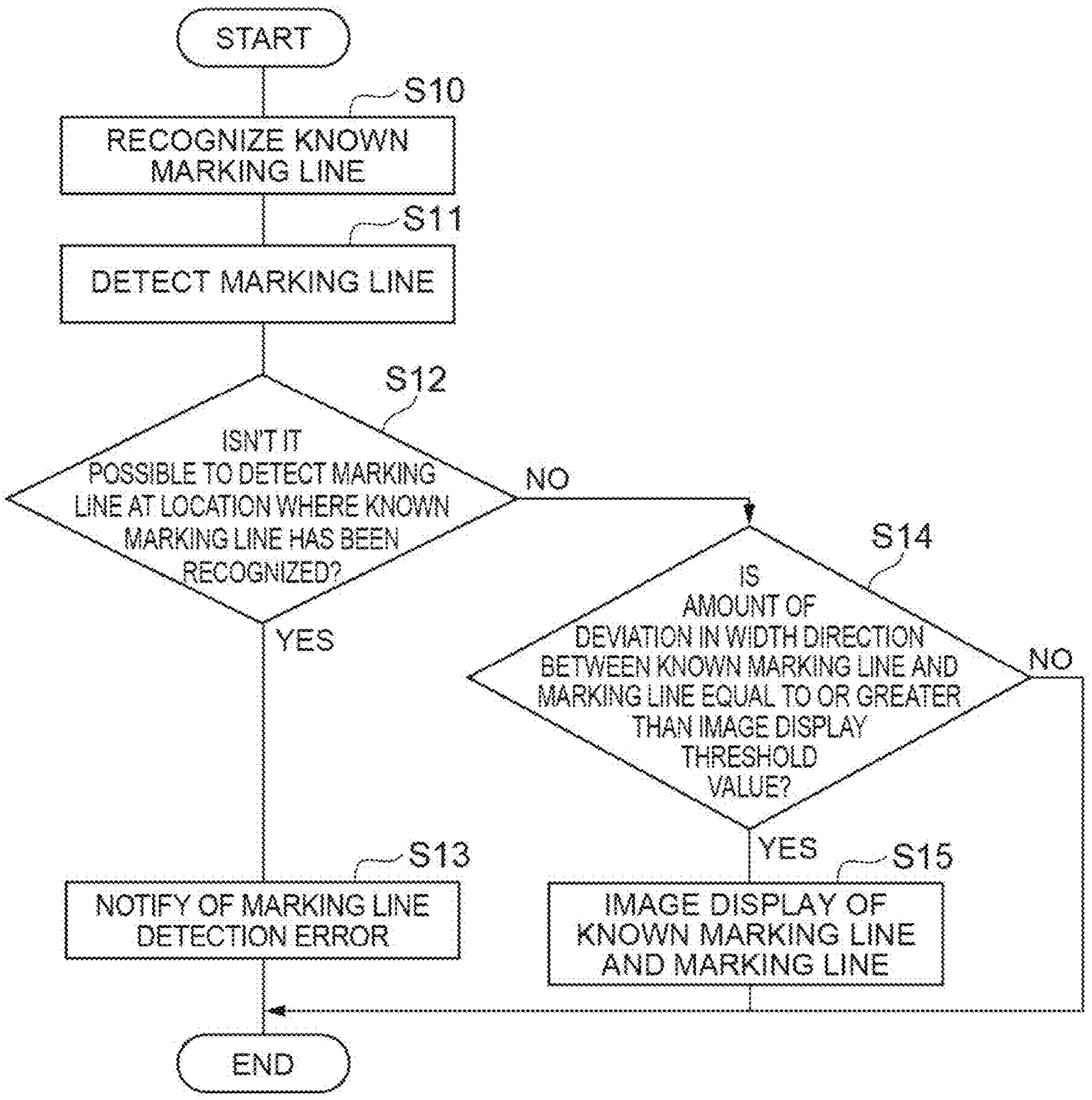
FIG. 5 is a flowchart showing an example of a marking line image display process.

Next, a processing method of the marking line detection device 100 according to the present embodiment will be described with reference to the diagrams. FIG. 5 is a flowchart showing an example of a marking line image display process. The marking line image display process is performed, for example, when the vehicle 1 needs to detect marking lines for automatic driving or driving support.

As shown in FIG. 5, in step S10, the ECU 20 of the marking line detection device 100 recognizes a known marking line in front of the vehicle 1 using the known marking line recognition unit 21. The known marking line recognition unit 21 recognizes a known marking line in front of the vehicle 1 based on map information including marking line information or past marking line detection information stored in the marking line database 14 and the location information of the vehicle 1 measured by the GNSS receiver 10. Thereafter, the ECU 20 proceeds to step S11.

In step S11, the ECU 20 detects a marking line in front of the vehicle 1 using the marking line detection unit 22. The marking line detection unit 22 acquires the detection result of the marking line in front of the vehicle 1 as an output from the marking line detection model 22*a* by inputting at least one of the captured image of the external camera 11 or the detection result of the radar sensor 12 to the marking line detection model 22*a*. Thereafter, the ECU 20 proceeds to step S12.

In step S12, the ECU 20 determines whether a marking line has been detected at a location where the known marking line has been recognized by the information providing unit 25. When it is determined that the marking line has been detected at the location where the known marking line has been recognized (when the marking line has been detected), the ECU 20 proceeds to step S14. When it is determined that the marking line has not been detected at the location where the known marking line has been recognized, the ECU 20 proceeds to step S13.

In step S13, the ECU 20 notifies the user of the marking line detection error using the information providing unit 25. The information providing unit 25 notifies the user of the marking line detection error through image display and/or sound output by controlling the HMI 15. Thereafter, the ECU 20 ends the marking line image display process.

In step S14, the ECU 20 determines whether or not the amount of deviation in the width direction between the known marking line recognized by the known marking line recognition unit 21 and the marking line detected by the marking line detection unit 22 is equal to or greater than the image display threshold value using the information providing unit 25. When it is determined that the amount of deviation in the width direction between the known marking line and the marking line is equal to or greater than the image display threshold value, the ECU 20 proceeds to step S15. When it is not determined that the amount of deviation in the width direction between the known marking line and the marking line is equal to or greater than the image display threshold value, the ECU 20 ends the marking line image display process.

In step S15, the ECU 20 performs image display of the known marking line and the marking line for the user of the vehicle 1 using the information providing unit 25. The information providing unit 25 performs image display of the known marking line and the marking line on the display of the HMI 15 by controlling the HMI 15. For example, the information providing unit 25 performs image display as shown in FIGS. 2 to 4. Thereafter, the ECU 20 ends the marking line image display process.

Figure 6:
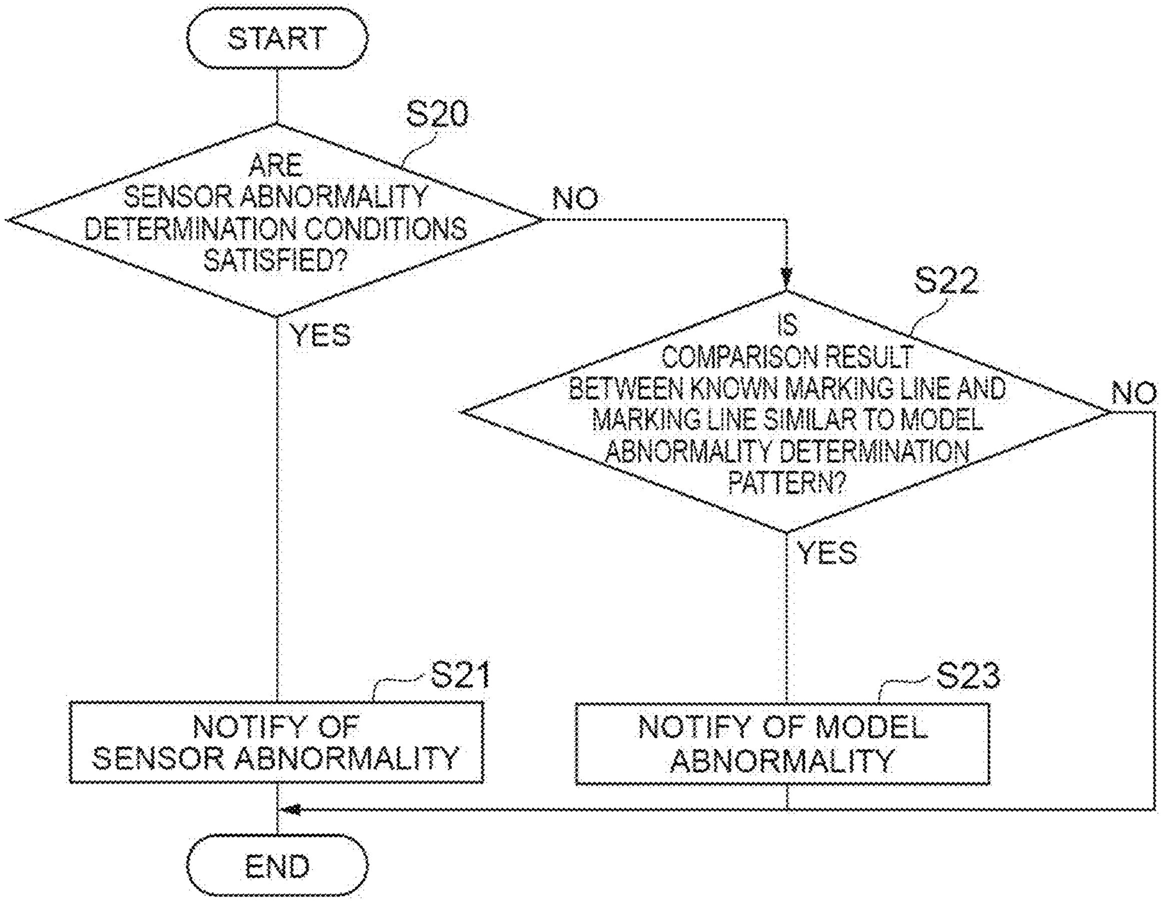
FIG. 6 is a flowchart showing an example of an abnormality notification process.

FIG. 6 is a flowchart showing an example of an abnormality notification process. The abnormality notification process is executed, for example, when the image display in step S15 of FIG. 5 is performed. The abnormality notification process may be performed when marking line detection is performed in automatic driving or driving support, regardless of image display.

As shown in FIG. 6, in step S20, the ECU 20 determines whether or not the sensor abnormality determination conditions are satisfied using the sensor abnormality determination unit 24. The sensor abnormality determination unit 24 determines that the sensor abnormality determination conditions are satisfied, for example, when an abnormal region is continuously detected in a part of the imaging range of the external camera 11 for a predetermined traveling time. When it is determined that the sensor abnormality determination conditions are satisfied, the ECU 20 proceeds to step S21. When it is not determined that the sensor abnormality determination conditions are satisfied, the ECU 20 proceeds to step S22.

In step S21, the ECU 20 notifies the user of the vehicle 1 of the sensor abnormality using the information providing unit 25. The information providing unit 25 notifies the user of the sensor abnormality through image display and/or sound output by controlling the HMI 15. Thereafter, the ECU 20 ends the abnormality notification process.

In step S22, the ECU 20 determines whether or not the comparison result between the known marking line and the marking line is similar to the model abnormality determination pattern using the model abnormality determination unit 23. When it is determined that the comparison result between the known marking line and the marking line is similar to the model abnormality determination pattern, the ECU 20 proceeds to step S23. When it is not determined that the comparison result between the known marking line and the marking line is similar to the model abnormality determination pattern, the ECU 20 ends the abnormality notification process.

In step S23, the ECU 20 notifies the user of the vehicle 1 of the model abnormality using the information providing unit 25. The information providing unit 25 notifies the user of the model abnormality through image display and/or sound output by controlling the HMI 15. Thereafter, the ECU 20 ends the abnormality notification process.

According to the marking line detection device 100 according to the present embodiment described above, when there is a difference between the currently detected marking line and the known marking line, which is a marking line detected in the past or a marking line on the map, it is possible to appropriately inform the user that a deviation has occurred in the marking line detection result by performing image display of the known marking line and the marking line for the user.

In addition, according to the marking line detection device 100, when the known marking line in front of the vehicle 1 is recognized but the marking line in front of the vehicle 1 cannot be detected by the marking line detection unit 22, the user is notified of the situation in which the marking line cannot be detected even though the known marking line is recognized. Therefore, the user can understand the marking line detection situation.

In addition, according to the marking line detection device 100, since the model abnormality determination unit 23 determines whether or not there is an abnormality in the marking line detection model 22*a* based on the comparison result between the known marking line and the currently detected marking line, the user can be notified of the model abnormality. Similarly, according to the marking line detection device 100, when the sensor abnormality determination unit 24 determines that the sensor abnormality determination conditions are satisfied, the user is notified of the sensor abnormality. Therefore, the user can understand the abnormality in the external sensor. The sensor abnormality determination unit 24 can determine that there is an abnormality in the external sensor when an abnormal region is continuously detected in at least a part of the detection range of the external sensor for a predetermined period of time.

While the embodiment of the present disclosure has been described above, the present disclosure is not limited to the embodiment described above. The present disclosure can be implemented in various forms including various changes and improvements based on the knowledge of those skilled in the art as well as the aforementioned embodiment.

The marking line detection device 100 does not necessarily need to include the model abnormality determination unit 23. Similarly, the marking line detection device 100 does not necessarily need to include the sensor abnormality determination unit 24. In addition, when the known marking line in front of the vehicle 1 is recognized but the marking line in front of the vehicle 1 cannot be detected by the marking line detection unit 22, the marking line detection device 100 does not necessarily need to notify the user.

What is claimed is:

1. A marking line detection device for detecting a marking line in front of a vehicle using a marking line detection model that is a machine learning model used for marking line detection, the device comprising:

a central processing unit configured to:

acquire a known marking line in front of the vehicle based on past marking line detection information or map information including marking line information and location information of the vehicle;

detect a marking line in front of the vehicle with the marking line detection model based on a detection result of an external sensor of the vehicle; and in response to an amount of deviation in a width direction between the known marking line and the marking line being equal to or greater than an image display threshold value, convert into an image in which the known marking line and the marking line are superimposed on a scenery in front of the vehicle, and cause a display mounted on the vehicle to display the image.

2. The marking line detection device according to claim 1, wherein, when the known marking line in front of the vehicle is acquired by the central processing unit but the marking line in front of the vehicle is not detected by the central processing unit, the central processing unit is configured to notify a user of a situation in which the marking line is not detected even though the known marking line is present.

3. The marking line detection device according to claim 1, wherein the central processing unit is configured to determine that there is an abnormality in the marking line detection model when a comparison result between the known marking line and the marking line is similar to any model abnormality determination pattern stored in advance.

4. The marking line detection device according to claim 2, wherein the central processing unit is configured to determine that there is an abnormality in the marking line detection model when a comparison result between the known marking line and the marking line is similar to any model abnormality determination pattern stored in advance.

5. The marking line detection device according to claim 1, wherein the central processing unit is configured to determine that there is an abnormality in the external sensor when an abnormal region is continuously detected in at least a part of a detection range of the external sensor for a predetermined traveling time, wherein the abnormal region is a region where the amount of deviation in the width direction between the known marking line and the marking line is equal to or greater than a sensor abnormality threshold value or a region where the marking line is not detected even though the known marking line is present.

6. The marking line detection device according to claim 2, wherein the central processing unit is configured to determine that there is an abnormality in the external sensor when an abnormal region is continuously detected in at least a part of a detection range of the external sensor for a predetermined traveling time, wherein the abnormal region is a region where the amount of deviation in the width direction between the known marking line and the marking line is equal to or greater than a sensor abnormality threshold value or a region where the marking line is not detected even though the known marking line is present.

7. The marking line detection device according to claim 1, wherein the central processing unit is configured to:

determine that there is an abnormality in the external sensor when an abnormal region is continuously detected in at least a part of a detection range of the external sensor for a predetermined traveling time; and determine that there is an abnormality in the marking line detection model when the central processing unit does not determine that there is an abnormality in the external sensor when the amount of deviation between the known marking line and the marking line is equal to or greater than the image display threshold value, wherein the abnormal region is a region where the amount of deviation in the width direction between the known marking line and the marking line is equal to or greater than a sensor abnormality threshold value or a region where the marking line is not detected even though the known marking line is present.

8. The marking line detection device according to claim 2, wherein the central processing unit is configured to determine that there is an abnormality in the external sensor when an abnormal region is continuously detected in at least a part of a detection range of the external sensor for a predetermined traveling time; and determine that there is an abnormality in the marking line detection model when the central processing unit does not determine that there is an abnormality in the external sensor when the amount of deviation between the known marking line and the marking line is equal to or greater than the image display threshold value, wherein the abnormal region is a region where the amount of deviation in the width direction between the known marking line and the marking line is equal to or greater than a sensor abnormality threshold value or a region where the marking line is not detected even though the known marking line is present.

* * * * *